United States Patent [19]
Lee

[11] Patent Number: 5,863,424
[45] Date of Patent: Jan. 26, 1999

[54] FILTER ELEMENT FOR OIL PANS AND FILTER ELEMENT/OIL PAN COMBINATION

[75] Inventor: Brian Thomas Lee, Charlotte, N.C.

[73] Assignee: Dana Corporation, Toledo, Ohio

[21] Appl. No.: 72,497

[22] Filed: May 5, 1998

[51] Int. Cl.$^6$ .......................... B01D 35/30; B01D 35/027; B01D 29/21

[52] U.S. Cl. .......................... 210/168; 210/172; 210/232; 210/450; 210/416.5; 210/460; 210/477; 210/493.3

[58] Field of Search .................................... 210/168, 172, 210/232, 493.3, 450, 416.5, 460, 477, 474

[56] References Cited

U.S. PATENT DOCUMENTS

| | | |
|---|---|---|
| 2,796,239 | 6/1957 | Holmes . |
| 3,056,501 | 10/1962 | Thorman et al. . |
| 3,480,149 | 11/1969 | Houser . |
| 4,352,737 | 10/1982 | Taniguchi . |
| 4,402,827 | 9/1983 | Joseph . |
| 4,450,081 | 5/1984 | Anderson . |
| 4,790,938 | 12/1988 | Younger . |
| 4,804,466 | 2/1989 | Cooper . |
| 4,826,598 | 5/1989 | Cain . |
| 4,828,694 | 5/1989 | Leason . |
| 4,915,852 | 4/1990 | Tomlinson . |
| 4,995,971 | 2/1991 | Droste et al. . |
| 5,049,274 | 9/1991 | Leason . |
| 5,292,432 | 3/1994 | Jainek . |

*Primary Examiner*—Thomas M. Lithgow
*Attorney, Agent, or Firm*—Millen, White, Zelano, & Branigan, P.C.

[57] ABSTRACT

A filter element for use in a pan, such as a oil pan for a vehicle transmission or internal combustion engine, is configured for positioning in the opening of a sump in the pan. In order to position the filter element, an inwardly projecting shoulder is provided on the wall of the sump upon which a shoulder on the frame of the filtering elements rests. Between the two shoulders a resilient seal is positioned and held compressed by a latching arrangement on the filter element. A preferred latching arrangement comprises plurality of detents that project laterally from the filter element frame and seat within indentations in the wall of the sump. Preferably, the filter element has a pleated filter media.

11 Claims, 7 Drawing Sheets

FILTER ELEMENT FOR OIL PANS AND FILTER ELEMENT/OIL PAN COMBINATION

FIELD OF THE INVENTION

The present invention relates to filter elements for oil pans and to filter element/oil pan combinations. More particularly, the present invention relates to filter elements for use with oil pans and to a combination of filter elements and oil pans, which oil pans are useful for containing transmission fluid and lubricating oil associated with automotive vehicles.

BACKGROUND OF THE INVENTION

Automotive devices such as transmissions, both automatic and standard which use recirculating-transmission fluid, as well as internal combustion engines which use recirculating lubricating oil, filter the fluid and oil to remove particulate contaminants therefrom. In these devices, oil drains into oil pans prior to being recirculated through the transmission or engine. In automatic transmissions, it is a practice to use a pan-type filter with a flow tube covered by a pan/tray with the tray acting as a sump for the fluid. Some sumps have a horizontal floor and others have an inclined floor. The filter life is determined by the area of the media and by utilization of the media in a way that provides good flow characteristics.

In order to decrease the cost of transmission maintenance by protecting the quality of the oil used as transmission fluid, there is a need to increase the life of the filter media, while improving efficiency and decreasing restriction thereof.

SUMMARY OF THE INVENTION

In view of the aforementioned considerations, it is a feature of the present invention to provide a new and improved filter element, wherein the filter element is configured for use in an oil pan useful in devices such as transmissions and internal combustion engines.

The invention is directed to a filter adapted to be disposed in the inlet of a sump comprising a frame surrounding a filter media, the frame having upper and lower portions separated by a downwardly facing shoulder which locates the filter element in the sump by engaging a stop surface in the sump. The frame includes a peripheral surface having a latching arrangement thereon which holds the filter element in the sump with a gasket comprised by the downwardly facing shoulder against the stop surface.

In another aspect of the invention, the latching arrangement comprises a plurality of projecting detents that are unitary with the frame.

In a further aspect of the invention, the aforedescribed filter element is used in combination with a housing that forms a pan used with a transmission of an automotive vehicle.

In still another aspect of the invention, the aforedescribed filter element is used in combination with a housing that forms an oil pan for lubricating oil of an internal combustion engine.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts throughout the several views, and wherein.

DETAILED DESCRIPTION

First Embodiment of the Invention—FIGS. 1–11

Figure 1:
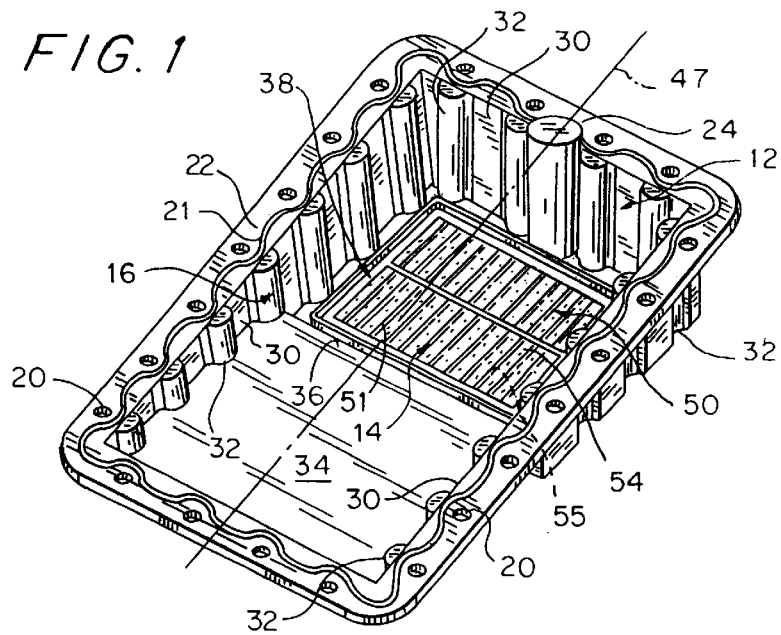
FIG. 1 is a top perspective view of an oil pan utilizing a filter element constructed and arranged in accordance with the principles of the present invention.
Figure 2:
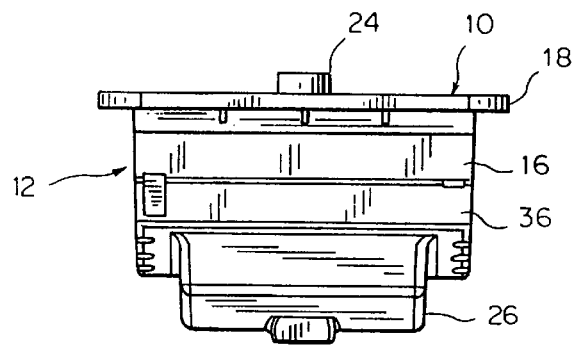
FIG. 2 is an end view of the oil pan of FIG. 1.
Figure 3:
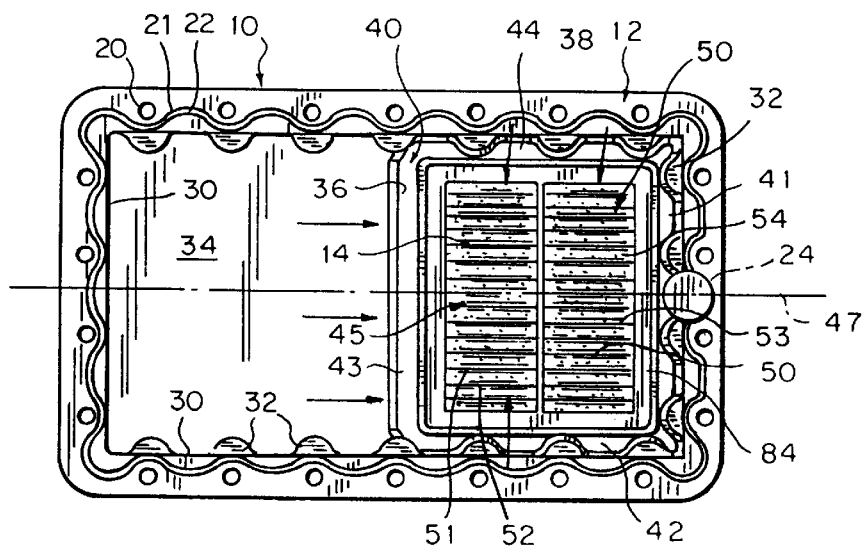
FIG. 3 is a top view of the oil pan of FIGS. 1 and 2.
Figure 4:
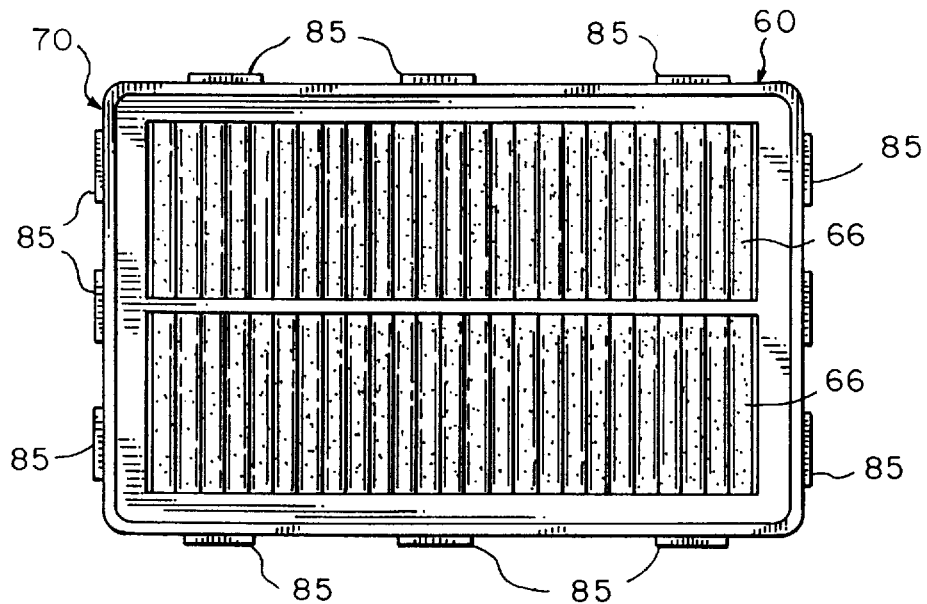
FIG. 4 is a top view of the filter element according to the present inventor used with the oil pan of FIGS. 1–3.
Figure 5:
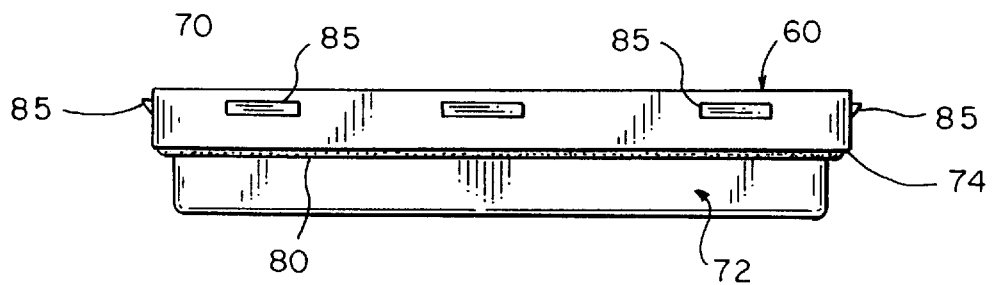
FIG. 5 is a front view of the filter element of FIG. 4, both side views being the same.
Figure 6:
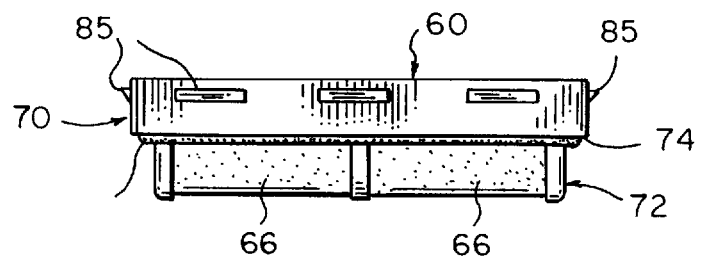
FIG. 6 is a side view of the filter element of FIG. 4, the back view being the same.
Figure 7:
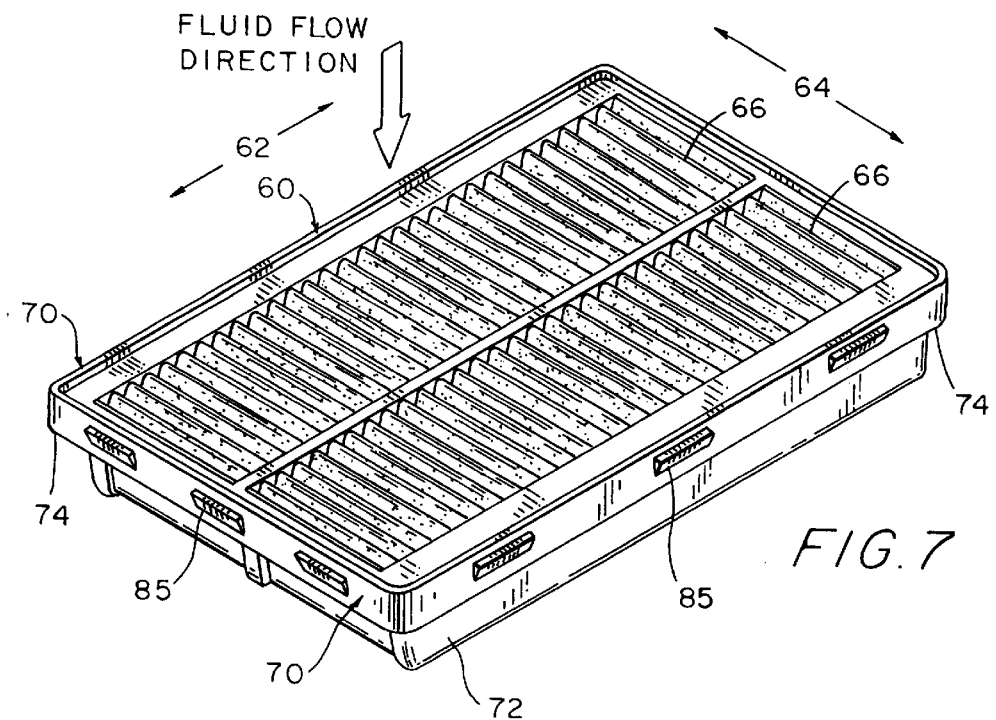
FIG. 7 is a top perspective view of the filter element shown in FIGS. 4–6.
Figure 8:
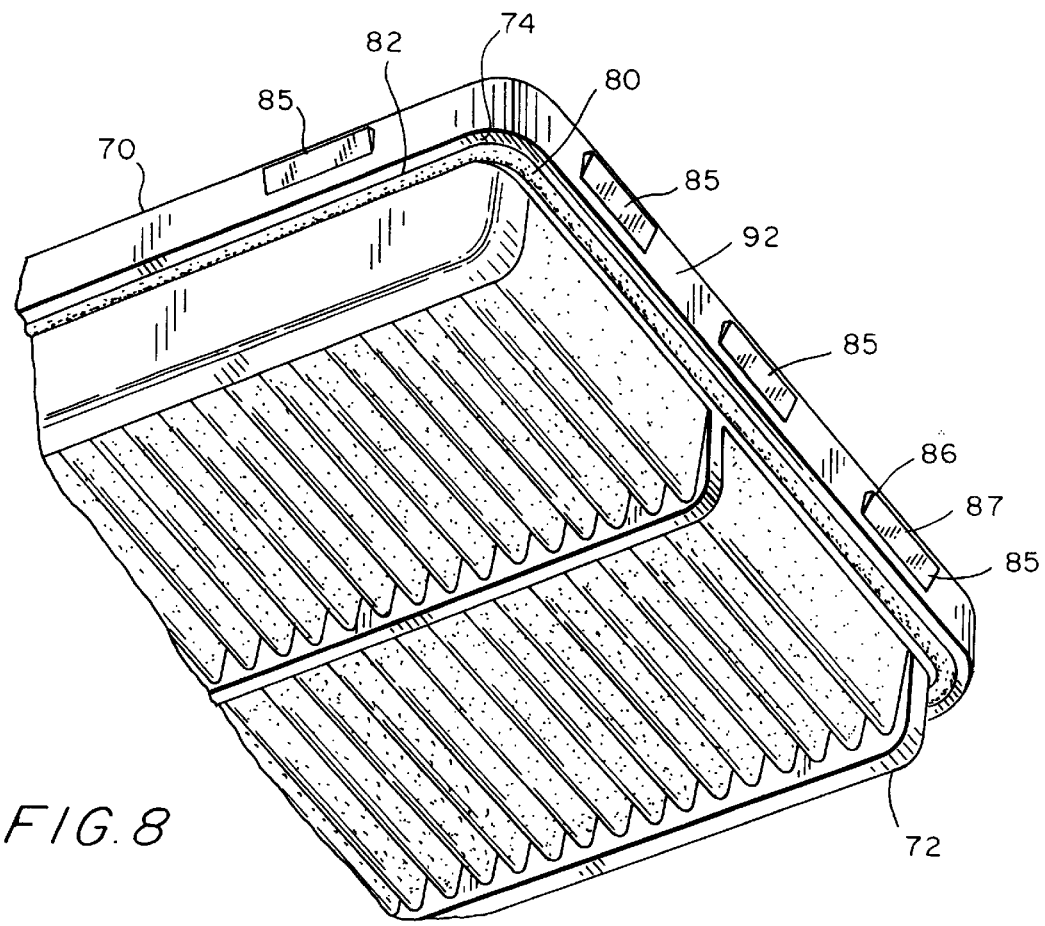
FIG. 8 is a bottom perspective view of a portion of the filter element shown in FIGS. 4–6.

Referring now to FIGS. 1–3, there is shown an oil pan/filter assembly 10 configured in accordance with the principles of the present invention, wherein the oil pan/filter assembly includes a housing 12 and a filter element 14, the filter element being configured in accordance with the principles of the present invention. The assembly 10 of FIG. 1 is configured for use with an automatic transmission; however, the same general arrangement is useable with standard transmissions, semi-automatic transmissions and any transmission where recirculated transmission fluid or oil is utilized. In addition, the housing 12 has use as an oil pan with an integral filter 14 used as an oil pan/filter assembly for internal combustion engines.

The housing 12 comprises an upper chamber 16 having a laterally projecting mounting flange 18 disposed therearound. The laterally projecting mounting flange 18 has a plurality of bolt holes 20 therein for securing the housing to the bottom of an automatic transmission housing (not shown). A groove 21 is formed in the flange 18, the groove having a gasket 22 received therein for sealing with the transmission housing (not shown). In operation, oil enters the upper chamber 16 through an inlet (not shown) and is recirculated by a return pipe 24 after passing through the filter 14 which separates the upper chamber 16 from a sump 26 having a base 27 beneath which the return pipe 24 is connected and a side wall 28. The return pipe 24 has the inlet of a suction pump (not shown) connected to the top thereof for pulling the filtered fluid from the sump 26 of the pan for recirculation back through the transmission (not shown).

The housing 16 has substantially vertical side walls 30 which include reinforcing ribs 32. A floor 34 in the upper chamber 16 of the housing 12 slopes toward the filter element 14 and the sump 26, so that all of the fluid within the upper chamber 16 is directed by the interior surfaces of the upper chamber toward the filter element and the sump 26. The sloping floor 34 terminates at an abrupt, substantially vertical wall 36 which forms a well portion 38 of the upper chamber 16, in which well portion the filter element 14 is seated. The seat for the filter element 14 is a land 40 which has four sloping surfaces 41, 42, 43 and 44 which slope toward the sump 26 and provide supporting surfaces for the filter 14, as well as defining an entrance 45 from the upper chamber 16 of the housing 12 to the sump 26.

The housing 12 has an axis 47 for mounting the oil pan/filter assembly 10 so that the axis is aligned with the direction of motion of the vehicle (not shown) on which the assembly is mounted. As is seen in FIGS. 1 and 3, the filter 14 has a pleated filter media 50 having upstream peaks and downstream peaks 51 and 52, respectively, which define peaks and valleys creating troughs 53 which extend parallel to the axis 47. The sides 54 and 55 of each trough 53 therefore act as dams to keep fluid in the troughs from shifting from one side of the filter element 14 to the other due to centrifical force as the vehicle turns.

Referring now to FIGS. 4–8, it is seen that the filter media 50 is rectangular and is mounted in a frame 60 preferably made of a relatively stiff material such as "NYLON®". The frame 60 is rectangular and includes a long dimension 62 and a short dimension 64. The long dimension 62 extends perpendicular to the axis 47 of the oil pan/filter assemble 10 (see FIG. 3). Preferably, the filter media 50 is a pleated filter media with pleats 66 extending parallel to the short dimension 64 and perpendicular to the long dimension 62 so that liquid, such as lubricating oil or transmission fluid, flows substantially evenly across the filter surface and is not dammed by pleats extending normal to the general direction of fluid flow in the housing 12.

Figure 10:
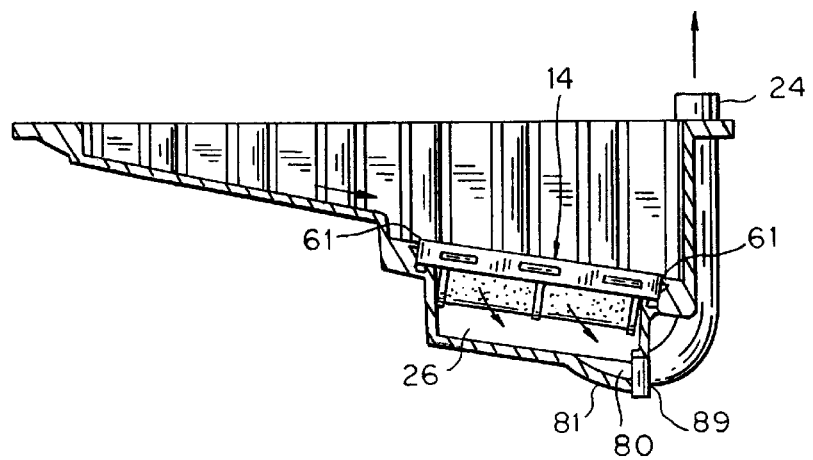
FIG. 10 is a cross-section taken along lines 10—10 of FIG. 3.
Figure 11:
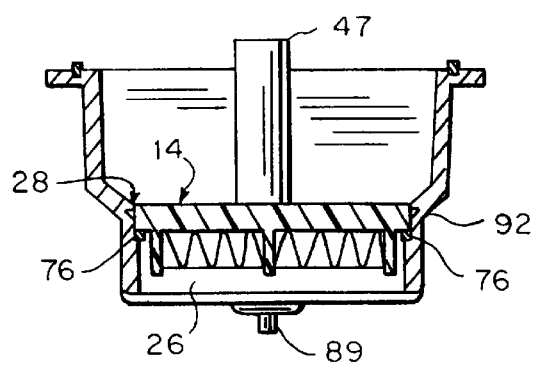
FIG. 11 is a cross-section taken along lines 11—11 of FIG. 3.

The frame 60 includes an upper portion 70 and a lower portion 72 delineated by a laterally projecting, downwardly facing shoulder 74. Consequently, the upper portion 70 has a larger dimension than the lower portion 72 so that the filter element 14 nests within the sump 26, as is seen in FIGS. 10 and 11, with the shoulder 74 resting on a shoulder 76 within the sump 26. In order to seal the filter element 14 with respect to the sump 26, a gasket 80 is disposed in a groove 82 in the shoulder 74 so as to be integral with the frame 60 of the filter element. The gasket 80 is preferably made of an elastic, deformable material, such as rubber or silicon rubber, which is more flexible than the relatively stiff material of the frame 60 so that when the frame 60 is pressed downwardly, the gasket 80 deforms to provide a sealing interface. It is also preferable that the gasket 80 be changed each time the filter is changed so that there is fresh gasket material with each fresh filter. It is necessary to change the gasket because the liquid being filtered, as well as mechanical forces such as vibration, may over time degrade and ablate the gasket material. There is a risk that ablated material of the gasket 80 could be entrained in the liquid being circulated and find its way into the machinery which the filter element 14 is utilized to protect.

In order to hold the gasket 80 compressed, and to couple the filter element 14 within the sump 26, the upper portion 70 of the frame 60 includes a plurality of detents 85. Each detent 85 has an abrupt upper surface 86 and a beveled surface 87 which slopes inwardly toward a vertically extending, peripheral surface 90 which extends upwardly from the shoulder 74 and surrounds the upper portion 70 of the frame 60. The detents 85 are adapted and arranged to be sufficiently deformable so that they resiliently hold the abrupt surface 86 beneath a corresponding latching surface 92 in or on the side wall 28 of the sump 26. Latching surface 92 is essentially a shoulder with a downward face 93 which can be on a projecting lip or can be the roof of an indentation 94. In a preferred embodiment, the shoulders provided by the latching surface 92 which are engaged by the flat 90 are grooves of twelve indentations disposed around and in the wall 28 of the sump 26.

In order to provide resiliency to the detents 85, an area 97 behind the detents may be relieved so that the portions 98 of the wall forming the peripheral surface 92 are flexible or elastic so that the detents may be pushed back to latch and unlatch from the indentations 94 which receive the detents. When the detents 85 are engaged, the gasket 80 is compressed so that the filter element 14 seats firmly within the sump 26, the gasket 80 both forming a seal and resiliently urging the flat surfaces 86 of the detents 85 into latching engagement with the surfaces 92 of the indentations 94.

While detents 85 are disclosed as a preferred embodiment, other latching arrangements may be utilized, such as having the detents on the wall 28 and indentations in the peripheral surface 92 so that the parts are simply reversed. Any other latching arrangement which holds the seal 80 compressed against the shoulder 76 is also contemplated as being within the scope of this specification. However, it is emphasized that the concept of projecting detents 85 as shown in the drawings is preferred.

It is only necessary that the ends of the pleats 66 be sealed. Consequently, it is only necessary in the lower portion 72 of the frame 60 to provide a structure which seals and stabilizes the ends of the pleats. This is accomplished by imbedding the ends of the pleats in a pair of side flanges 100 and 102 so that the ends of the pleats are stabilized within a ridged structure. In a preferred embodiment, there is a central rib 104 paralleling the side flanges 100 and 102 in which ends of separate pleated filter media packs 106 and 110 are embedded, or otherwise sealed with respect thereto.

Figure 9:
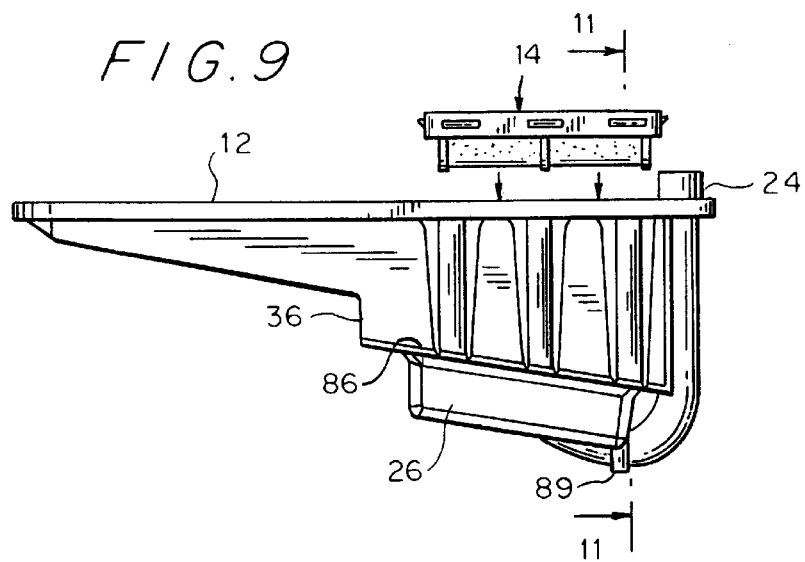
FIG. 9 is a side view showing the filter of FIGS. 4–8 being inserted into the oil pan of FIGS. 1–3.

Referring now to FIGS. 9, 10 and 11, filter 14 is shown detached from and seated within the sump 26 of the housing 12 comprising the oil pan/filter assembly 10. This is seen in FIG. 11, a preferred embodiment of the invention includes a bypass valve 110 through the filter element 14 which opens if pressure on the filter media becomes excessive indicating that the filter media is clogged. If the filter media is clogged, it is highly desirable to have fluid circulate anyway. By providing a bypass valve which opens when the media 50 is clogged, fluid is still available for use in the associated machinery which, for example, may be a transmission or the lubricating system of an internal combustion engine. In accordance with one embodiment of the bypass valve 110, a valve element 112 is urged by a spring 114 to a closed position under normal operation. When pressure within the system becomes too great due to clogging of the filter media 50, the spring 114 is compressed by fluid pressure being applied against a piston valve surface 118, thereby opening the bypass valve 14 and allowing fluid to bypass the filter media. Preferably, a warning light comes when this condition occurs notifying the driver of the vehicle or operator of the machinery that the filter element 14 should be changed.

The housing 12 is preferably molded from a composite material such as "Nylon 6®" and, in one embodiment of the invention, may have the filter element 14 affixed thereto so as to be changed and disposed of with the housing 16 which is removed by loosening bolts holding the housing to the transmission via the bolt holes 20.

Second Embodiment of the Invention—FIGS. 12–16

Figure 12:
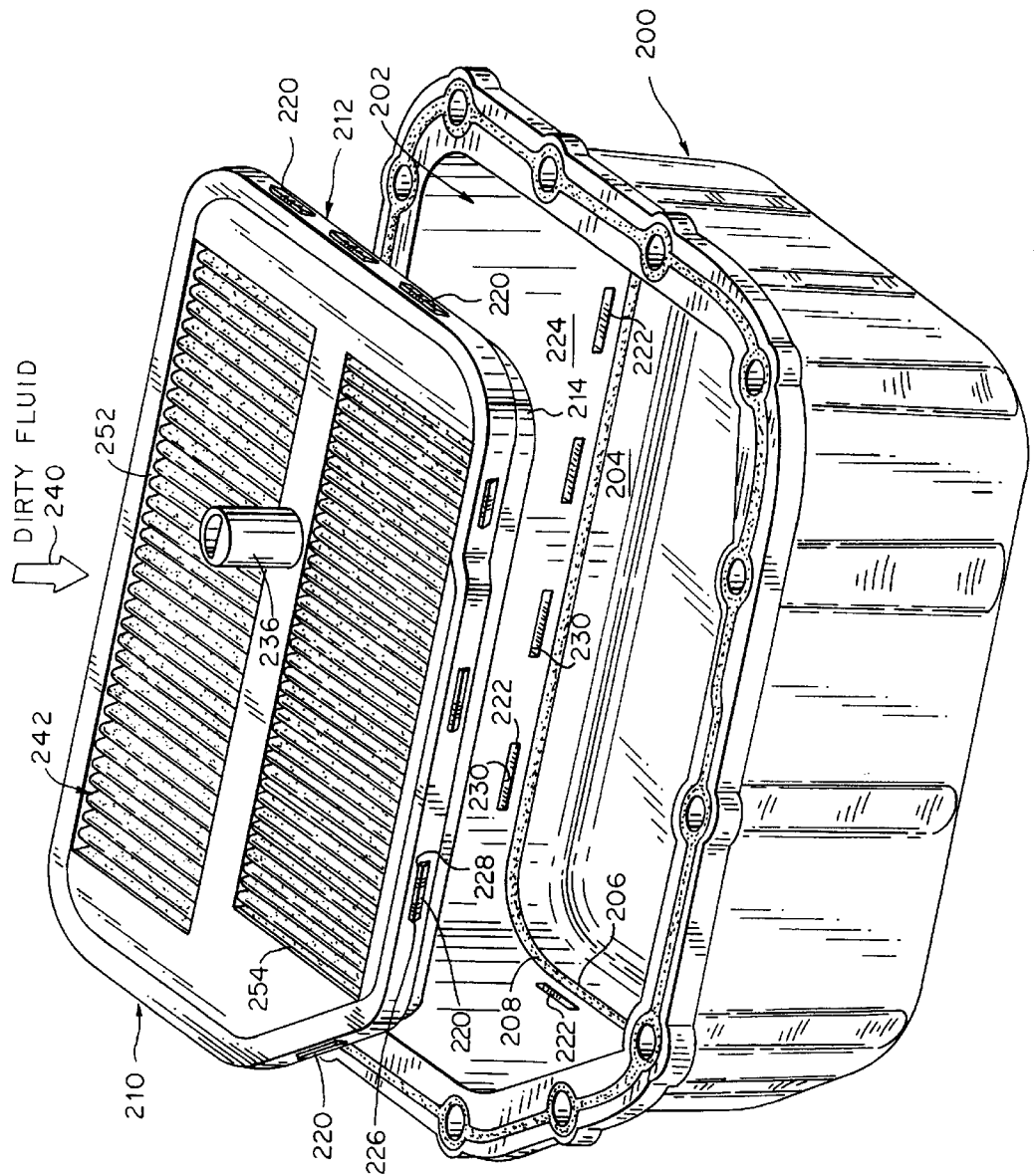
FIG. 12 is a top exploded view, in perspective, showing a filter element configured in accordance with the second embodiment of the invention and a transmission oil pan with which the filter element is used.

Referring now to FIG. 12, there is shown a transmission oil pan 200 which includes an upper space 202 and a sump 204 which is separated by a shelf 206 that has a gasket 208 integral with the shelf. A filter element 210 rests on the shelf 206 and is sealed with respect to the housing by the gasket 208. The filter element 210 has a rim 212 and a lower projecting portion 214. When the filter element 210 is seated within the transmission oil pan 200, the bottom surface 216 of the rib engages the rubber sealing gasket 208 on the shelf 206 with the lower portion 214 received within the sump 204.

The rim 212 has a plurality of detents 220 which are unitary therewith and engage in indentations 222 in a wall 224 of the upper space 202 of the pan 200. Each of the detents 220 has a beveled can surface 226 which slopes downwardly toward the surface of the rim 212 and an upper horizontal or flat surface 228 which projects substantially laterally from the rim in a perpendicular direction so as to seat beneath the top surfaces 230 of the indentations 222. In this way, the filter element 210 is seated firmly within the pan 220.

Projecting through the filter element 210 is a suction tube 236 which draws transmission fluid or oil from the sump 204. As is indicated by the arrow 240, dirty fluid flows through the top face 242 of the filter element and passes out of the bottom face 244 as cleaned filter fluid which accumulates in the sump 204 and is then reused by the transmission (not shown) by being sucked back through the tube 236 which is connected to a pump (not shown).

Figure 13:
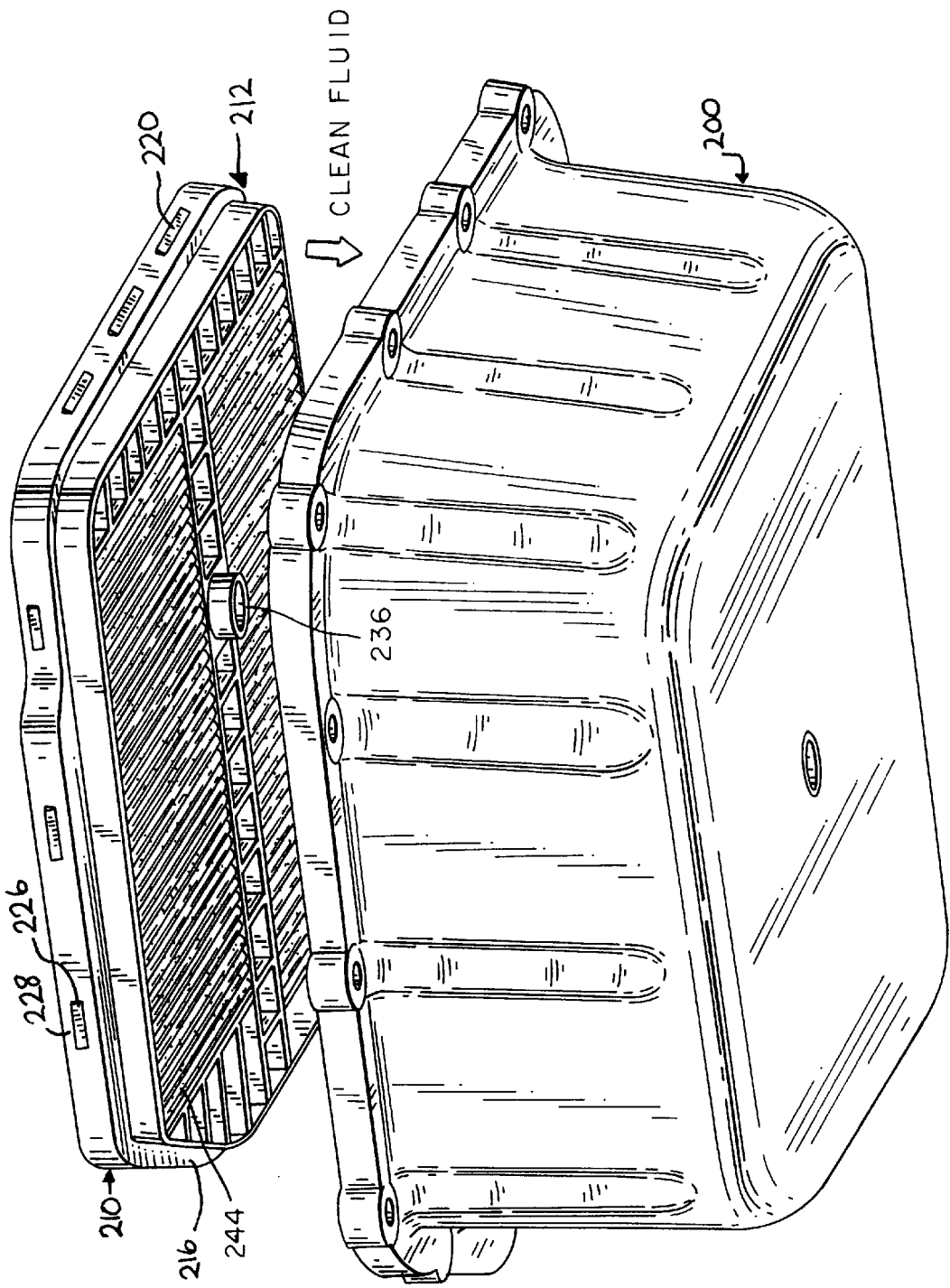
FIG. 13 is a bottom exploded view in perspective of the filter element and transmission oil pan of FIG. 12.
Figure 14:
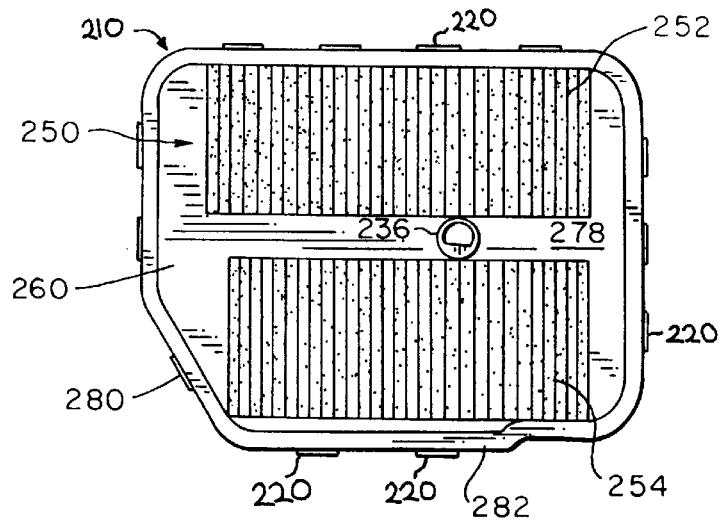
FIG. 14 is a top view of the filter element of FIGS. 12 and 13.
Figure 15:
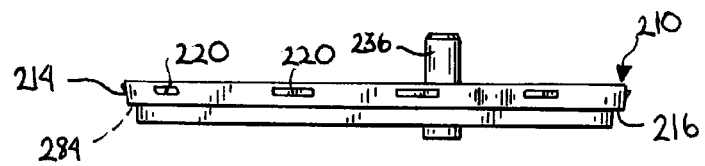
FIG. 15 is a side view of the filter element of FIGS. 12–14.
Figure 16:
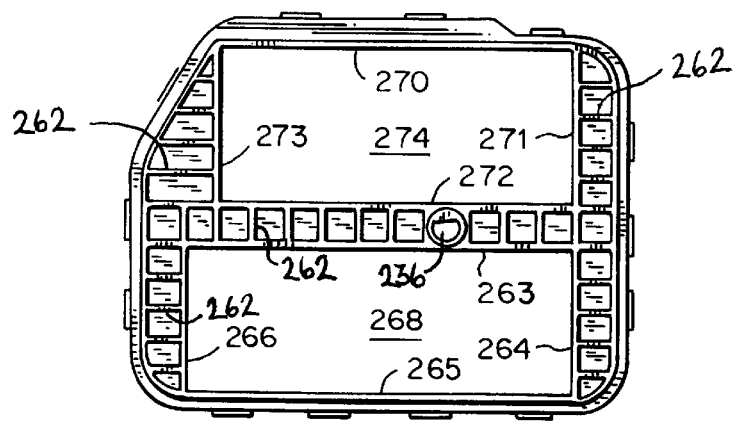
FIG. 16 is a bottom view of the filter element of FIGS. 12–15.

Referring now to FIGS. 14–16, in combination with FIGS. 12 and 13, it is seen that the filter element 210 is comprised of a frame 250 and first and second filter media packs 252 and 254. Preferably, the filter media packs 252 and 254 are comprised of pleated material such as pleated cellulose with the filter media of pack 252 having perhaps seventy-five pleats and that of pack 254 having perhaps seventy pleats. The frame 250 is preferably made of Nylon 6/6® and has a deck portion 260 which is supported by an array of ribs 262. The ribs 262 rigidify the frame 250 and abut the walls 264, 265, 266 and 267 to define an enclosure 268 for the first filter pack 252 and abut the walls 270, 271, 272 and 273 to define a rectangular enclosure 274 of the second filter pack 254. The suction tube 236 is disposed in a bridge portion 278 of the frame 250. The frame 250 is not equilateral so that it is readily oriented with respect to the pan 200 because the frame has a short side portion 280 which is slightly offset and a projecting lateral portion 282 which is also laterally offset. The width of the filter element is approximately 9 inches, the length is approximately 12 inches and the thickness approximately 1 inch.

It is contemplated that the shoulder or bottom surface 216 of the rim 214 may have a groove 284 for receiving the integral rubber gasket 208 on the shelf 206 of the pan 200.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A filter element for use in a pan into which is drained a recirculating fluid, wherein the filter element is disposed between a main collection chamber and a sump, the sump being defined by a vertically extending wall and a floor, an inwardly projecting shoulder on the wall of the sump, the shoulder being spaced from the floor of the sump, the filter element comprising:

a frame having an upper portion and a lower portion, the upper portion having a downwardly facing shoulder extending laterally beyond the lower portion for supporting the filter element on the lower inwardly projecting shoulder;

a vertically extending peripheral surface extending upwardly from the shoulder and surrounding the upper portion of the frame;

a latching arrangement on the vertically extending peripheral surface for latching with a complementary latching arrangement on the sump wall;

a gasket disposed between the downwardly facing shoulder on the frame and the inwardly projecting shoulder of the sump for sealing the frame with respect to the housing when the latching arrangement on the frame latches with the complementary latching arrangement on the sump wall;

a filter media disposed within the frame and sealed where it contacts the frame.

2. The filter element of claim 1, wherein the latching arrangement on the vertically extending peripheral surface of the frame comprises a plurality of detents spaced one from another around the peripheral surface adapted for receipt behind a downwardly facing surface of the complementary latching arrangement.

3. The filter element of claim 2, wherein the detents are unitary with the peripheral surface and comprise a beveled surface extending upwardly to a laterally extending latching surface which engages the downwardly facing surface of the complementary latching arrangement.

4. The filter element of claim 3, wherein the frame and filter media are substantially rectangular with long sides and short sides and wherein the filter media is a pleated filter media with the pleats extending parallel to the short sides.

5. The filter element of claim 4, wherein the gasket is integral with the downwardly facing shoulder of the frame.

6. The filter element of claim 1, wherein the frame includes a deck with openings therethrough and wherein the filter media is disposed in the openings.

7. The filter element of claim 6 further including a bridge separating the openings in the deck and a suction tube extending through the bridge.

8. The filter element of claim 7 further including an array of ribs beneath the deck.

9. The filter element of claim 6 further including an array or ribs beneath the deck.

10. The filter element of claim 1, wherein the frame is asymmetrical.

11. The filter element of claim 6, wherein the frame is asymmetrical.

\* \* \* \* \*